March 18, 1969 A. WELTI 3,434,141
APPARATUS FOR CONTROLLING A MOVING SELF-GUIDING OBJECT
IN ORDER TO PREVENT A COLLISION
Filed Dec. 7, 1967

INVENTOR,
ARNO WELTI
BY Jacobi & Davidson
ATTORNEYS

United States Patent Office 3,434,141
Patented Mar. 18, 1969

3,434,141
APPARATUS FOR CONTROLLING A MOVING SELF-GUIDING OBJECT IN ORDER TO PREVENT A COLLISION
Arno Welti, Zurich, Switzerland, assignor to Albiswerk Zurich AG, Zurich, Switzerland, a corporation of Switzerland
Filed Dec. 7, 1967, Ser. No. 688,950
Claims priority, application Switzerland, Dec. 16, 1966, 18,090/66
U.S. Cl. 343—6      8 Claims
Int. Cl. G01s 9/48

ABSTRACT OF THE DISCLOSURE

An improved method and appartus for controlling a moving, self-guiding object for the purpose of preventing a collision. The underlying basis of steering in this regard is guiding or guidance in accordance with the principle of a constant bearing course or invariable line of sight in a geometric horopter. Guiding takes place as a control towards a "collision" with virtual or imaginary targets derived from the plotted data of further moving actual objects which are on a collision course. By employing data storage devices, it is possible to simultaneously determine the presence of a number of objects which are located on a collision course and the course of the self-guiding object can be determined relative to each of the remaining objects. The course or heading corrections to avoid an actual collision can be indicated by optical means and proper corrective control can take place manually, or such heading corrections can be automatically delivered directly to the control or steering system.

Background of the invention

The present invention generally relates to guidance systems and particularly concerns an improved method and apparatus for steering or guiding a moving self-guiding object in order to prevent a collision.

Aircraft have already been equipped with various detectors so as to prevent collisions, these detectors responding to energy radiated by other aircraft operating in the same air space. These detectors, for example, bring about an indication or reading on a cathode-ray tube or screen. Upon the appearance of such indication, the pilot must carry out an evasive maneuver in an attempt to avoid collision. A disadvantage of a system of this type is that all aircraft in the neighboring air space will be indicated regardless of whether or not the aircraft are actually located on a collision course.

Accordingly, it is apparent that each aircraft should be equipped with devices which positively indicate a dangerous situation to the pilot and provide him with certain information concerning an evasive movement necessary for circumventing the danger. Thus, there is desired an automatic system for preventing a collision, such system being capable of determining, without any external assistance, if a collision seems possible and capable of providing measures to prevent same. With such type system, each aircraft would protect itself without being dependent upon other aircraft. In particular, a system of this type would be operable even if other aircraft were not equipped with any similar system. The prior art, though, was of the opinion that such a system, regardless of how great its need and usefulness, could not be built.

However, under the designation $\varphi$-method, i.e., a method utilizing constant line of sight or constant bearing course, a target-seeking or homing system is known where a device, such as a radar device, is provided for directional determination, and which continually measures or plots the elevational angle and lateral angle of a target. A control mechanism is connected with the radar device and acts upon the control or steering elements of the object so that a zero change with time of the plotted or located angles between the object and the target should be obtained. According to a known physical construction for determining a collision course, the angles are plotted or located by a revolving directional finder and this information is delivered to a storage device, by means of which it is possible to determine the change of the plotted angles occurring between two revolutions. If these angles do not change, then a collision-heading or course can be deduced from this fact and a warning installation or a control mechanism is actuated.

My virtue of this proposal, the earlier or previous viewpoint of the prior art has been refuted. But even so, positive prevention of a collision, i.e., anti-collision, is still not ensured. This is the case, since anti-collision cannot always be satisfied by a random evasive heading or course, rather can be only fulfilled by a directed course with which the path of the collision aircraft is intersected, but with the actual arrival of the aircraft at the point of intersection occurring at different times. Accordingly, anti-collision can be thought of, in this manner, as distinguished from collision, by the arrival of the objects at different times at the point of intersection of their paths. Naturally, there are numerous other courses which could prevent a collision. These evasive courses, however, for the most part, require considerable lateral acceleration of an aircraft which cannot always be furnished. However, flying craft or the like can change their flight altitude to avoid collision, whereby the direction of the flight path is not changed during an evasive maneuver. Still, such type evasive movement is not desired since the prevailing safety regulations with respect to flight altitude are not maintained.

The above concept is likewise applicable to ships, which can only change their course by turning towards the left or right; and for automobiles wherein a change of speed is the only sensible maneuver.

Summary of the invention

Accordingly, it is a primary object of the present invention to provide an anti-collison system which can be effectively utilized for flying craft, ships and automobiles.

Another object of this invention is to provide an anti-collision system of the type under consideration which will operate with equal integrity regardless of whether or not the collision vehicle is equipped with a corresponding system.

An additional object of this invention is to provide an anti-collision system of the type under consideration wherein weight and space requirements are maintained relatively small.

Still another important object of the present invention relates to an improved method of guiding objects to positively avoid collisions.

Now, in order to implement these and still further objects of the present invention which will become more readily apparent as the description proceeds, the inventive method and the system for the performance thereof are based upon a technique wherein the self-guiding object measures both its own path and at least two points of the paths of the further objects. From the data of the path of the self-guiding object and from the data of each path of the further objects, a possible collision is determined on the basis of a heading having constant or invariable line of sight, i.e., a constant bearing course. When a collision course has thus been determined, the constant line of sight or constant bearing course is displaced in time and steering commands to avoid an actual collision are derived from the displaced bearing course or line of sight and transmitted to the self-guiding object.

*Brief description of the drawings*

The invention will be better understood, and objects other than those set forth above will become apparent when consideration is given to the following detailed description thereof. Such description makes reference to the annexed drawings wherein.

*Description of the preferred embodiments*

With further reference to the invention and in consideration of the drawings, it is deemed advisable to initially explore the three dimensional aspects of a collision between two aircraft in terms of a two dimensional operation in a plane so as to obtain a better understanding of the concepts involved. With binocular vision, the geometric location of all points portrayed during a certain eye position either at surface points thereof or at corresponding points (retina locations) is designated as a "Horopter." If one is satisfied with the image at the surface points, then the horopter can be deductively derived and a mathematic or geometric horopter is obtained. If the image is deemed necessary at the corresponding retina locations, then the horopter must be determined by experimentation. In this latter instance, there is obtained a true or empirical horopter. In the former, the geometric or mathematical horopter is the Vieth-Mueller circle.

Figure 1:
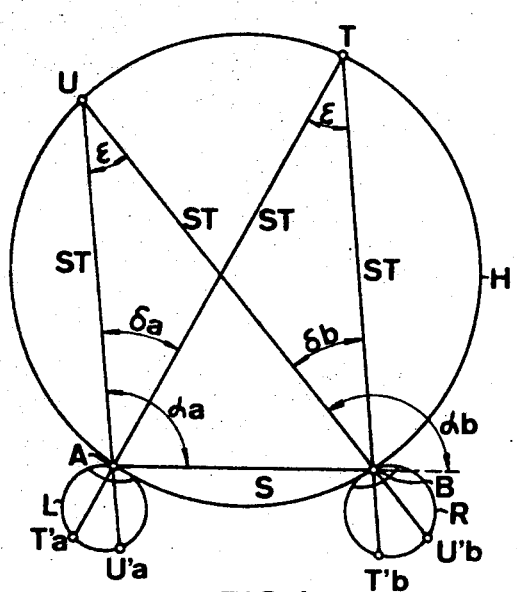
FIGURE 1 schematically illustrates a circular horopter with binocular vision.

Continuing, it will be seen that FIGURE 1 depicts a Vieth-Mueller circle H which passes through the pupils A and B of two eyes L and R, respectively. Each of the two peripheral points T and U on the circle H are depicted at the retina and, specifically, in the left eye L as points T′a and U′a and, at the right eye R, as points T′b and U′b. Both pupils A and B are connected by a straight line S which is a chord of a circle. The pupils A and B are connected by visual rays ST with the peripheral points T and U.

From known geometrical considerations, the visual rays ST are legs of peripheral or inscribed angles $\epsilon$ and all inscribed angles $\epsilon$ enclosing the same chord S are of the same magnitude. The visual rays ST emanating from the eyes L and R and directed to the two peripheral points T and U enclose angles which are designated by $\delta a$ at the left eye L, and by $\delta b$ at the right eye R. The lateral angles between the chord S and the visual rays ST are designated by $\alpha a$ and $\alpha b$, respectively. The angles $\delta a$ and $\delta b$ provide the azimuth of corresponding retina locations U′a and U′b and T′a and T′b, respectively. The most important relationship in the Vieth-Mueller circle described resides in the constant or invariable angular relationship of:

$$\delta a - \delta b = 0 \quad \text{(Equation 1)}$$

According to geometric law of exterior angles in the triangle, the difference of the lateral angles at the chord S is constant:

$$|\alpha a - \alpha b| = \Delta \alpha = \text{constant} \quad \text{(Equation 2)}$$

If the peripheral point U is considered as a migrating or moving point on the circle H, then the first derivative with respect to time of Equation 2 can be taken and equated to zero to derive:

$$(\alpha a - \alpha b)\cdot = (\Delta \alpha)\cdot = 0 \quad \text{(Equation 3)}$$

By means of these three equations, the most important principles of the geometry of sight are formulated. When looking with two eyes having the same image position at the retina, the instantaneous point of intersection of two visual rays ST is displaced along the periphery of a circle taken through the pupils A and B. The chord S and two visual rays ST form a triangle which will be hereinafter designated as a convergence triangle.

The concept of the Vieth-Mueller circle discussed above will be seen to provide a basis for the determination of a condition for the collision of two vehicles or objects which move along paths which are intersected by visual rays.

Figure 2:
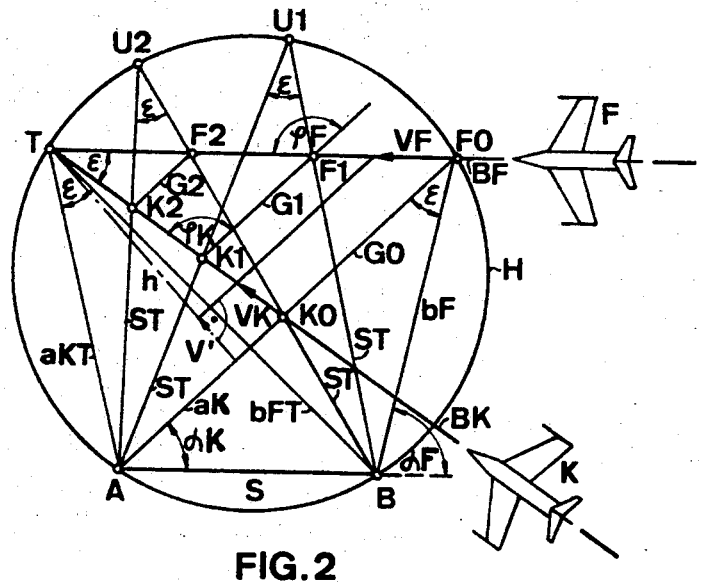
FIGURE 2 depicts the geometry and the target-impact operation at the circular horopter for collision.

The collision condition is considered by reference to a Vieth-Mueller circle in conjunction with FIGURE 2. Two points A and B again represent the pupils of two eyes or, for that matter, of two position indicators. Both points A and B determine a circular beam or bundle having a common chord S. Two aircraft F and K, for example, are represented as moving along linear paths, BF representing the path for the aircraft F and BK the path for the aircraft K. As long as both paths BF and BK do not run parallel, or a collision has not already occurred, then these paths will intersect one another. This point of intersection represented by T then defines a circle H from the circular beam, in that circle H is defined by three points, A, B and T. So that the collision consideration can be carried out on the circle H, the vertex angle of the two paths BF and BK at the point T must be of the same magnitude as a peripheral or inscribed angle of the convergence triangle A, B and T or A, B and U, respectively. In other words, this vertex angle must likewise amount to $\epsilon$. This is the only limitation which is required for the consideration of collision on the Vieth-Mueller circle.

Now, if a collision should occur, then the two aircraft F and K must assume exactly fixed points FO and KO along their paths BF and BK respectively, and must possess an exactly maintained velocity VF and VK, respectively. These two points can be established by a visual ray $a$K drawn from the left pupil A to the furthest aircraft starting point FO at the periphery of the circle H, the point of intersection of this ray $a$K with path BK defining the starting point KO for the aircraft K. The path KO-FO is known as a line of sight or bearing course.

From the science of guiding defensive missiles, it is known that a first body will collide in each instance with a second body if the line of sight or bearing course in which the second body is plotted or located from the first body is constant. In FIGURE 2, a random point can be assumed along one path, for instance point F1 at the path BF. A line G1 parallel to the line $a$K can be drawn through this point F1. The point of intersection K1 between the parallel line G1 and the path BK defines the location where the body or object K must be in order for a collision to occur with object F. Now, if the visual rays ST are drawn, specifically, from the pupil A to the point K1 and from the pupil B to the object F at point F1, then the point of intersection of the visual rays ST is located on the periphery of the circle H at point U1. The same is also true for each other point as, for example, points K2 and F2, for which the point of intersection of the visual rays ST is located at point U2. A collision will occur if the point of intersection of the visual rays is located at point T. This representation of a collision geometrically leads to the following collision considerations.

An altitude or height $h$ is drawn as a chain-dot line for the collision or impact triangle KO, FO, T. Furthermore, the velocity vector VF of the aircraft F and the velocity vector VK of the aircraft K have been inserted as well as the angles $\varphi F$, $\varphi K$, between the parallel line G1 and the paths BF and BK, respectively.

The geometric-kinematic formulation of the collision or impact condition as a constant line of sight or constant bearing course at the collision triangle signifies that the difference of the projections V' of the instantaneous velocity vectors VF and VK of both aircraft at the altitude $h$ of the instantaneous collision triangle must be regulated at each moment to zero. Thus:

$$\epsilon = \varphi F - \varphi K \quad \text{(Equation 4)}$$

and $$VF \sin \varphi F - VK \sin \varphi K = 0 \quad \text{(Equation 5)}$$

If the instantaneous angle between the straight line A–B is designated as the base line S and if the visual rays $aK$ and $bF$ are designated by reference characters $\alpha K$ and $\alpha F$, then the above Equations 4 and 5 can be related or equated to the Vieth-Mueller circle discussed above. The geometric correlation in the Vieth-Mueller circle of the collision condition as a constant line of sight at the collision triangle of two aircraft F and K results in the following:

$$\epsilon = \alpha F - \alpha K = \text{constant} \quad \text{(Equation 6)}$$
$$\epsilon = \varphi F - \varphi K = \text{constant} \quad \text{(Equation 7)}$$

From the similarity of the triangles there results:

$$VF/VK = aK/bF = aKT/bFT$$

The convergence triangles A, B, U1 and A, B, U2, the collision triangle FO, KO, T, and the main convergence triangle A, B, T are, under the conditions which lead to the Vieth-Mueller circle, similar triangles. The legs FO–T and KO–T as well as the visual rays A–T and B–T therefore possess proportionate lengths. From this it can be recognized that the ratio of the aircraft velocities $VF:VK$ at each moment of time recurs in relation to the distances $aK:bF$ from the pupils A, B to the visual targets K and F.

Figure 3:
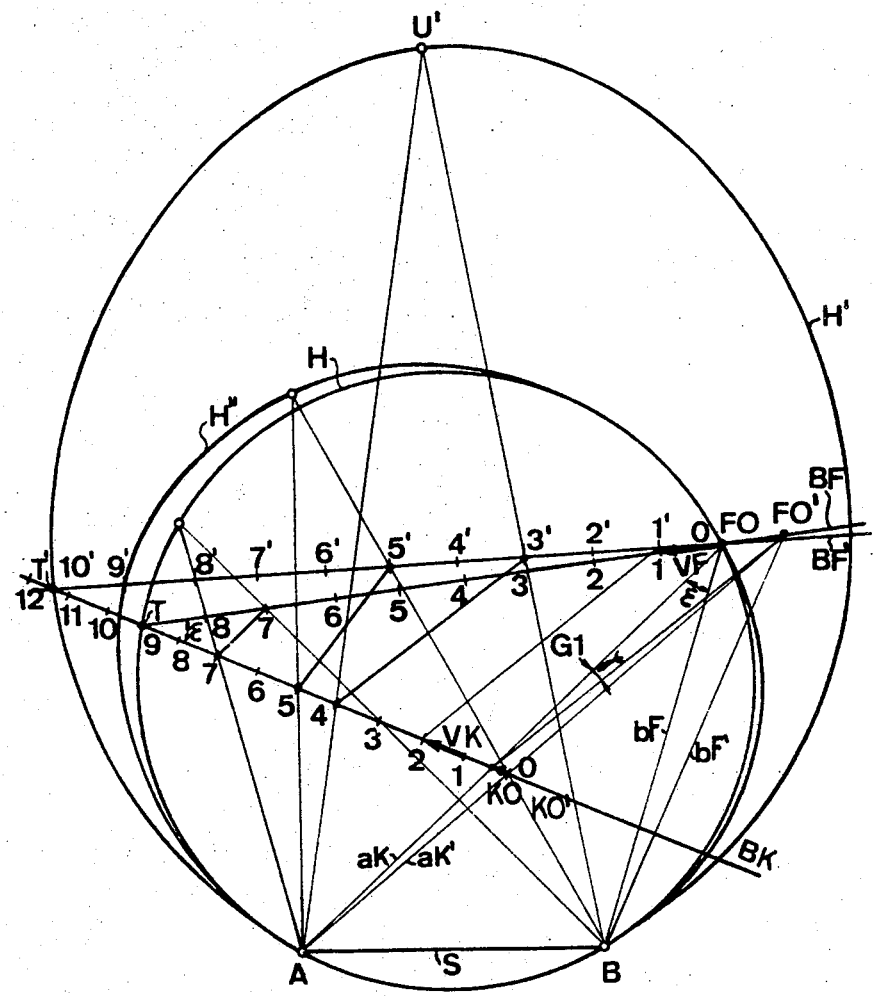
FIGURE 3 depicts the target-impact operation at the horopter during collision and anti-collision.

The Vieth-Mueller circle H, the chord S between the pupils A and B, and the paths BF and BK with the point of intersection T have been transferred into the representation of FIGURE 3. It is possible to determine the collision triangle FO, KO, T by means of the visual rays $aK$ and $bF$. This signifies that two aircraft which fly along the illustrated paths BF and BK with the velocity vectors VF and VK, will surely collide at point T. For the sake of clarity, each path has been sub-divided into equidistant points and numbered beginning with points FO and KO, respectively. Collision will occur at point 9. Now, if the object at the path BF is graphically rearwardly displaced by one unit from point FO to point FO', one unit corresponding to the spacing between two equidistant points, then a collision will only occur if the object at the path BK is likewise displaced from point KO to point KO'.

With this latter point in mind, it is possible to construct a steering or guide mechanism which influences or controls an object in such a manner that a collision can be prevented. If, for example, the object F remains unchanged at its path BF, but its observer or pilot is given false information about the position of object F or about the position of the object F along the path BF, then the observer or pilot can never bring about collision of his object F with the object K.

This contention can be proven in a simple manner. In FIGURE 3, the object at location FO along the path BF is given the false information that it is located at place FO', in other words that it is delayed in time. This initially results in a rotation of the bearing course through the angle $\gamma$. If afterwards the new bearing course is plotted with the aid of the point at the path BK, and the velocity vector VF rotated so that the first parallel line G1 is intersected, then there results a rotation of the path BF into the path BF'. This new path BF' intersects the path BK at point T'. If the new path BF' is likewise divided by equidistant points, the spacing of which is the same as those along the path BF, and if these points are numbered starting with point FO, then it will be seen that the body or object F at the path BF' arrives at the impact or collision point T' approximately at 10' and the body K along the path BK arrives approximately at 12.

As illustrated in FIGURE 3, the spacing of the points corresponds to the length of the velocity vectors VF and VK, so that it is possible to read from the numbering the time of arrival at the collision or impact point T'. However, this shows that the two objects F and K arrive at different times at the impact point T' and therefore these objects cannot collide.

In FIGURE 3, a collision will be explained with the Vieth-Mueller circle as the horopter. Now, if in FIGURE 3, the visual rays are drawn from the pupils A and B to appropriately numbered points at the path BF' and BK, for instance to point 4 at path BK and point 3' at the path BF', and then extended further until their point of intersection U', then it can be recognized that all of these intersection points are disposed on a curve H'. Curve H' is, by definition, likewise a horopter only it is no longer a circle, rather an ellipse which passes through the points A, B and T'. The control of the body or object F along the path BF' can therefore be based upon a collision control which works with data which has been displaced in time and positively results in the prevention of a collision.

The correctness of this statement can be proved and likewise established with a horopter. If visual rays are drawn from the points A and B to the points at which the objects are located at the actual time, for instance at point 5 at the path BK and at point 5' at the path BF', then there is again formed a different horopter, the ellipse H''. This horopter H'' intersects the path BF' approximately at point 9' and intersects the path BK between the points 9 and 10. Accordingly, the horopter H'' does not pass through the path intersection point T', and by definition no collision occurs.

Figure 4:
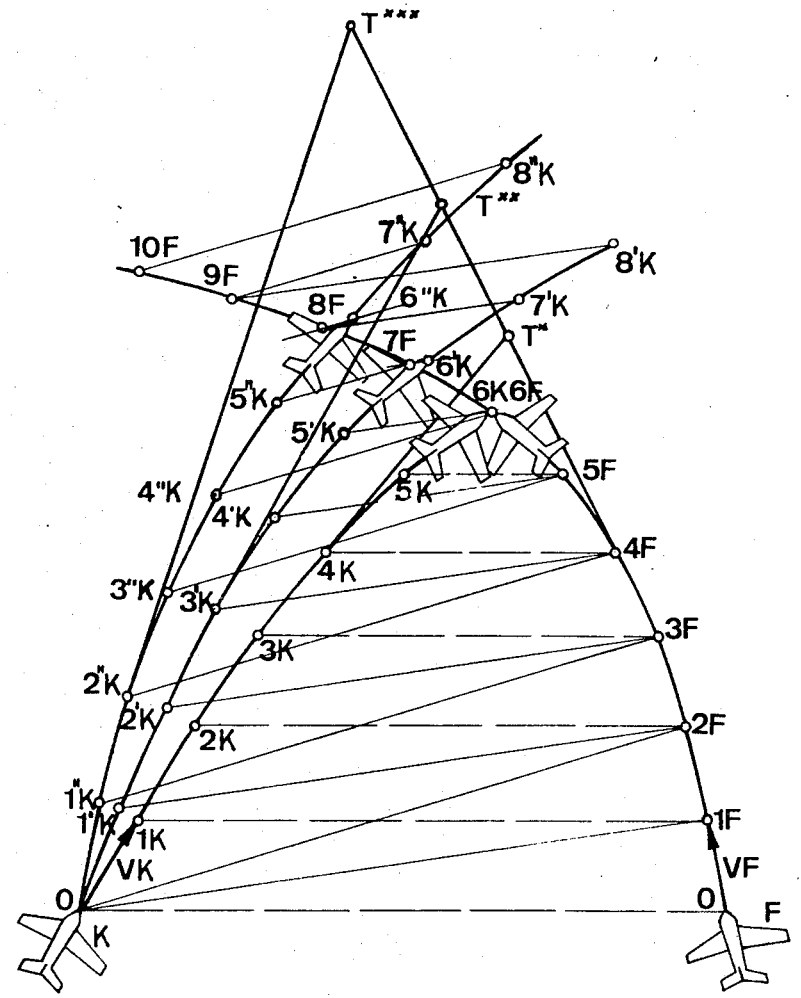
FIGURE 4 depicts the trajectories in a plane for uniform velocity of the objects.

Although the above explanation relates to the situation where the flight paths are linear, this method also operates when curved paths are provided as will be now explained with reference to FIGURE 4. In this figure, two airplanes F and K are represented together with their velocity vectors VF and VK. An optional path is prescribed for the aircraft K which is defined by the points O–1K–2K . . . 6K. Initially, there is assigned to the aircraft F the task of colliding with the aircraft K. By means of the constant bearing course there results the path with the points O, 1F, 2F . . . 6F. The points 6F and 6K coincide so that the collision will occur at this location.

The aircraft K determines at point O of its path or trajectory the possible collision and proceeds according to the proposed method. Its own positional data is delivered delayed in time by one unit to the control mechanism, the delay corresponding to the flight time between two points on the path. The control command also indicates in this case a collision with the aircraft F. The control mechanism then brings about an evasive maneuver or movement and steers the aircraft K onto the path 1'K, 2'K . . . 8'K. The points of intersection of this path with the path of the aircraft F occurs between the points 5' and 6' at the path of the aircraft K as well as 6 and 7 at the path of the aircraft F.

If the positional data is delivered to the aircraft K delayed by twice the time, then the point of intersection would be between the points 5''K and 6''K as well as between 7F and 8F.

For greater comprehension, an aircraft has been depicted at each location point 6 of their respective paths. It can be clearly recognized that with the collision conception, impact occurs at point 6, whereas the two controlled paths do not result in any collision. The collision triangles 4F, 4K, T*; 4F, 3'K, T and 4F, 2''K, T*, on the other hand, indicate that it is possible to carry out a control on a collision course.

The apparatus for the performance of the inventive method is manifested by the features that mounted on the self-guiding object, there is a first position indicator for locating or tracking the further body or object, the first position indicator being designed for conical scanning or searching motion with the axis of symmetry of the scanning motion being in the direction of movement so as to give a signal representing the position of the further body, and a second position indicator for the determination of the direction of a spatially fixed axis taken through a gyro axis, the second position indicator likewise being equipped for conical scanning motion with the axis of symmetry of the scanning motion in the direction of an axis of the object, so as to give a signal representing the direction of movement of the self-guiding object. The two position indicators are operably connected with one another via a synchronization device for controlling the synchronization of the scanning motion. Further, the respective angles determined during the revolving scanning between a reference direction and a position in which one object can be detected is utilized for the positional or tracking data. Additionally, there is provided an analog converter coupled with a storage device for generating the difference between both measured polar angles. The storage device delivers a signal upon determination of the same angular difference during successive corresponding measurement data. A time-delay mechanism which can be switched on and off by the aforesaid signal is mounted between the position indicator for determining the direction of the spatially fixed axis and the analog converter. Means are provided in the control device or apparatus of the guided object which, also, due to the signal, act upon the control mechanism and, because of the changed angular differences after the time delay, bring about a proper control for maintaining the angles constant and, upon completion of the proper control, said means switch-off.

Figure 5:
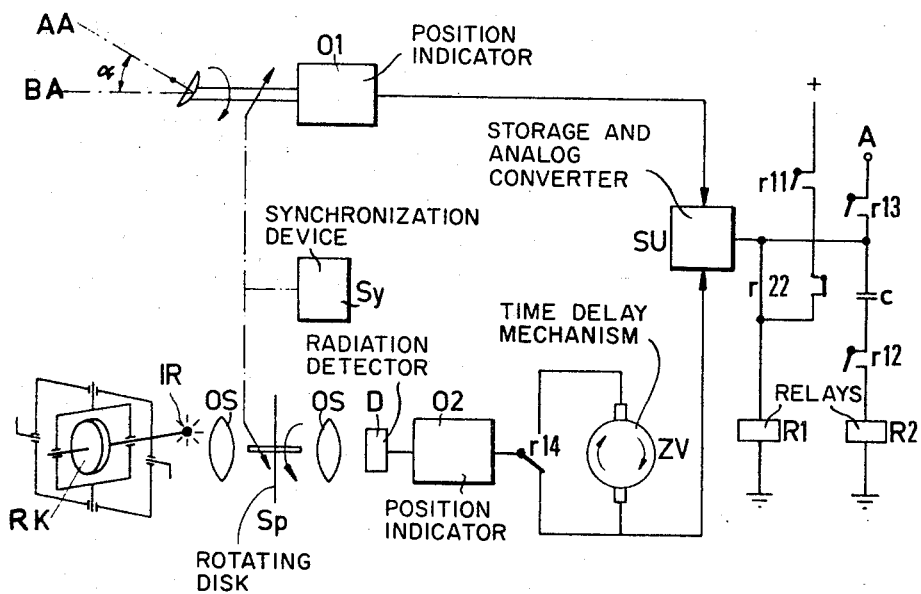
FIGURE 5 is a block diagram of an embodiment of an apparatus for controlling anti-collision.

FIGURE 5 illustrates a simplified embodiment of the inventive apparatus. In the depicted construction, two position indicators O1 and O2 are controlled by a synchronization device Sy. The first position indicator O1 is a radar device, the antenna axis AA enclosing an angle α with the axis of movement BA, such that during rotation of the antenna AA about the movement axis BA, a conical scanning results.

The second position indicator O2 is a radiation detector which is responsive to light or infrared radiation. The second position indicator O2 serves to determine the direction of movement of the object. In order to achieve this function, the position of the axis of a gimbal mounted gyro RK is measured. In the illustrated embodiment, one end of the gyro shaft is provided with a suitable radiation source IR which is detected via an optical image-reproducing system OS and a radiation detector D. A rotating disk Sp is located at the optical image-reproducing system OS. The center of rotation of this disk Sp is disposed at the principal axis of the optical image-reproducing system OS. This rotating disk Sp consists of radiation impermeable material and has a radial, radiation-permeable gap.

The synchronization device Sy insures that the rotation of the antenna at the first position indicator O1 and the disk Sp at the second position indicator O2 remain in synchronism. Both of the position indicators O1 and O2 can be simple in construction. They must only transmit a pulse upon determination of a trackable or locatable object. Therefore, it is not necessary to carry out any angular measurements.

Continuing, it will be recognized that the output of the first position indicator O1 is directly connected to a storage and analog converter SU, and the output of the second position indicator O2 is connected via a switch contact r14 either through a time-delay mechanism ZV to a second input of the storage and analog converter SU or directly to such second input of said storage and analog converter SU. The storage device serves for storing the initial incoming pulse from a position indicator O1 or O2 until the arrival of a pulse from the other respective position indicator O2 or O1. The pulse spacing is measured by the analog converter SU and is stored until measurement of the next or succeeding pair of pulses. Furthermore, the analog converter SU is designed or equipped in such a manner that, in the presence of two equal pulse intervals, it delivers a pulse-shaped signal which tends to switch a relay R1. Relay R1 is self-holding via a rest contact r22 and a work contact r11. Contacts r12, r13 and r14 are actuated by the relay R1 and thereby couple a second relay R2 via a capacitor C with the output of the analog converter SU. When a second pulse-shaped signal appears, this relay R2 switches and de-energizes the relay R1 with the self-holding action via the contact r22. The relay R1 couples the analog converter SU with an output A by means of its contact r13.

During the tracking or location of an object, the position indicator O1 delivers a pulse to the analog converter SU. The position indicator O2 likewise delivers a pulse when the gap of the rotating disk Sp permits the radiation of the radiation source IR to pass to the detector D. Since both movements proceed synchronously, the spacing between the two pulses provides a measurement for the change in condition of the two located objects. As soon as there is a "rest," that is to say, when no change has been determined, the bearing course is constant in accordance with that previously explained above, and the uniform movement leads to a collision. The analog converter SU must thus only determine whether two successive pairs of pulses possess the same pulse spacing. This determination brings about switching of the relay R1 and therefore a throwing of the contact r14. As a result, the time-delay mechanism ZV is switched in, and the pulses from the position indicator O2 arrive at the analog converter SU delayed. The determined "rest" now yields to the "movement" in that now a false information condition or situation is simulated.

If simultaneously therewith, a regulation circuit which acts upon the control mechanism of the object and may, for instance, comprise a flight director R (see FIGURE 7) in the case of aircraft, is connected at the output A, then through course regulation thereof it is possible to again establish the condition of "rest."

In so doing, the two objects are again located on a collision course or heading, only in this instance the positional data have been artificially falsified into the converse. The object is, in actuality, on a controlled course which prevents a collision because of the time delay. The analog converter SU delivers a new pulse which now energizes the relay R2 via the closed work contact r12. Relay R2 de-energizes the relay R1 by means of its contact r22 and the contact r14 is thrown so that now, once again, the position pulses from the position indicator O2 are directly delivered to the analog converter SU. Likewise, the regulating circuit is cut off by means of the contact r13. Thus, the inventive arrangement or apparatus is again reset and is prepared to locate the next collision condition in order to prevent a collision in the same manner.

By means of the relay R1 it is possible to also place into operation optical or acoustical warning installations so that the pilot or driver of the controlled object will have his attention drawn to a possible collision. Further, automatic regulation and control is not necessary if the pilot or driver can assume an evasive course for such length of time until the warning installation switches off.

Figure 6:
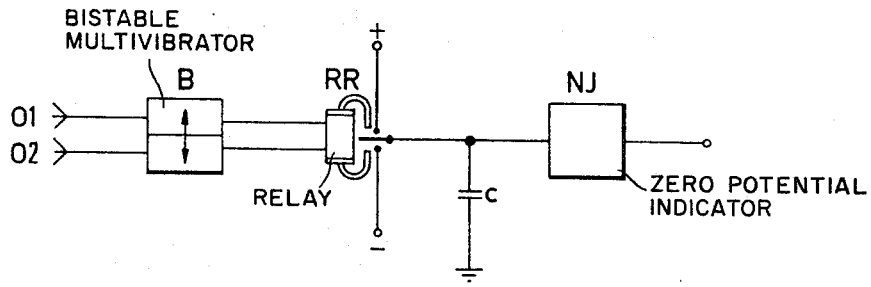
FIGURE 6 is a circuit diagram showing details of the apparatus depicted in FIGURE 5.

FIGURE 6 depicts an exemplary embodiment of an analog converter SU of the type employed in the apparatus structure of FIGURE 5. In this case, the pulses from the position indicators O1 and O2 are delivered to a respective flip-flop stage of a bistable multivibrator B. The flip-flop stages supply a polarized relay RR having three switch positions. The switch contact, in one position, applies negative potential to a switch output and, in the other position, positive potential. A capacitor C and a zero potential indicator NJ are coupled with this switch output.

The pulses from the position indicators O1 and O2 cause, through the bistable multivibrator B, the capacitor C to be alternately charged with positive or negative potential during each pulse. With the same pulse spacing, a charging uniformity or constancy appears which can be designated by zero potential. During this condition, a pulse is delivered by the zero potential indicator NJ which could be a Schmitt trigger, for instance, and which can be employed for switching the relay R1 in FIGURE 5.

Figure 7:
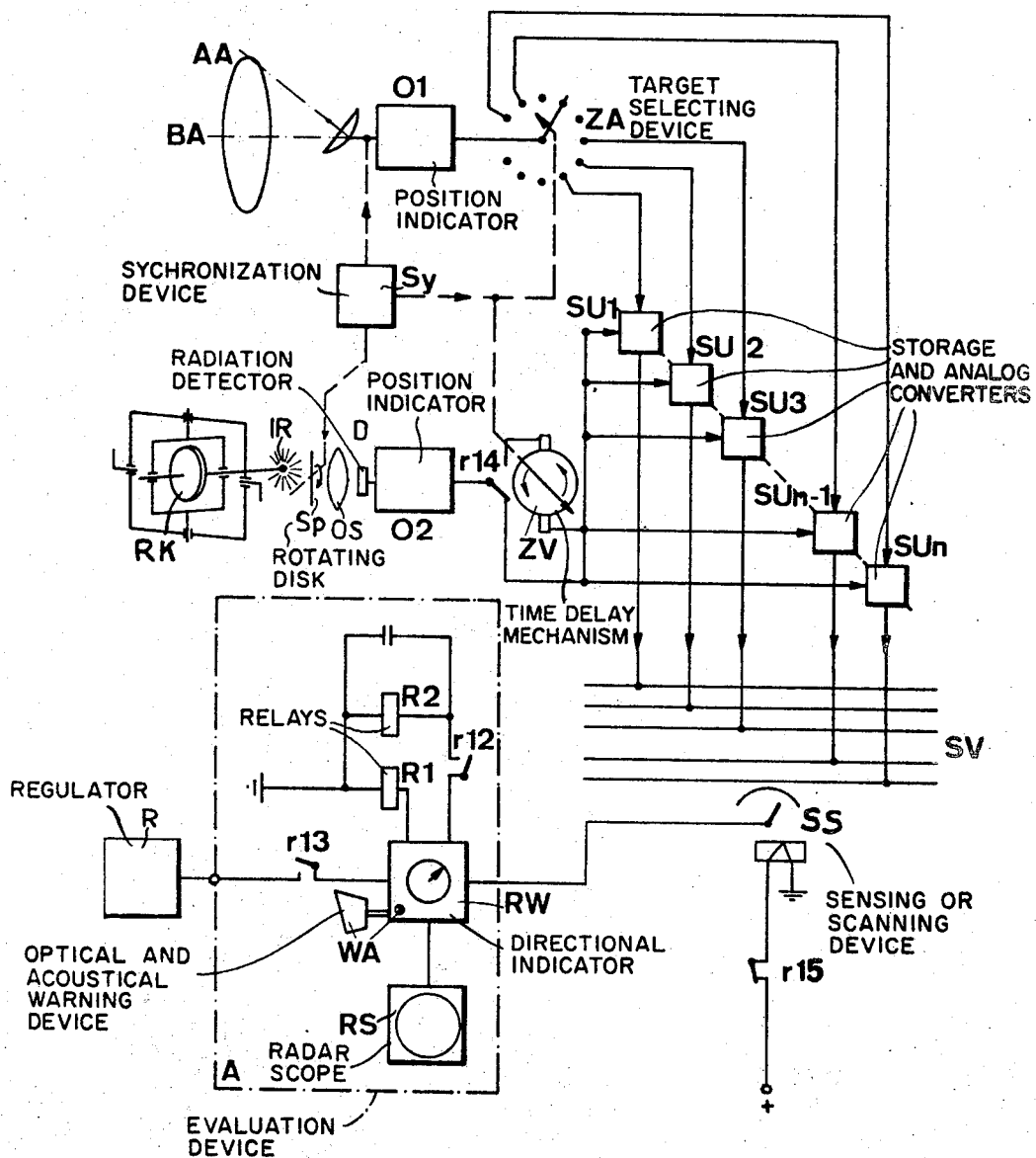
FIGURE 7 is a modified embodiment of the inventive apparatus for recognition of a collision course with a plurality of further objects.

FIGURE 7 illustrates a further embodiment of the inventive apparatus which elaborates upon the apparatus structure of FIGURE 5. This exemplary embodiment is contemplated for use in the determination of a number of objects which are in the range of the position indicator O1, whereby each of these objects is checked along its course or heading with regard to collision.

It will be understood that, in this case, the two position indicators O1 and O2 with the synchronization device Sy and the time-delay mechanism ZV are of the same construction and are electrically coupled together in the same manner as previously considered in conjunction with FIGURE 5. However, in this construction, there is additionally incorporated a target selecting or screening device ZA at the output of the position indicator O1. The target selecting device ZA is a revolving switch which is maintained in synchronous revolving motion with the scanning motion of the position indicator O1 by means of the syncronization device Sy. Each output of the target selecting device ZA is connected with a storage and analog converter SU1 . . . SUn. On the other hand, the output of the second position indicator O2 is connected to all analog converters SU1 . . . SUn. The outputs of the analog converters SU1 . . . SUn are connected to an evaluation device A through a schematically illustrated distribution circuit SV as well as a sensing devise Ss. The evaluation device A embodies a radarscope, a directional indicator RW with an optical and acoustical warning device WA, and is connected with a relay circuit which is similar to that shown in FIGURE 5. The sensing or scanning device Ss at the distribution circuit SV is actuated via a relay rest contact r15, so that one analog converter SU after the other is tested or scanned.

The target selecting device ZA exhibits the same number of switch positions for one revolution thereof as there are object space sectors in the surrounding area which should be tracked or located. Likewise, the same number of analog converters is provided for this purpose. In so doing, each respective space sector is associated with one analog converter. The outputs of the analog converters SU are again appropriately connected together via the distribution circuit SV provided for this purpose, and which scans or tests the outputs of the analog converters SU by means of the sensing or scanning device Ss. As soon as one analog converter SU has determined uniform pulse spacings or intervals, contact r15 is opened by means of the evaluation device A and the sensing or scanning device Ss remains at standstill in the distribution circuit SV until, through appropriate course regulation of the self-guiding object, uniform pulse intervals are again determined a second time at the evaluation device A. This would indicate that potential collision has been prevented. Therefore, the scanning or sensing device Ss can again advance further in order to scan or test the outputs of the other analog converters to ascertain a possible collision with further objects.

The above described embodiments are preferably utilize with flying bodies or objects. If such embodiments were to be used with ships or automobiles, there must be provided a scanning movement in one plane in lieu of the conical scanning movement. A radar device can be used for tracking with ships, since small velocities are employed for relatively large distances. On the other hand, for automobiles or the like, a much more sensitive or finer tracking must occur. In this case, it is contemplated that an infrared-position indicator or tracking device might be provided, which device is responsive to heat radiation of the other vehicle. A laser position indicator or tracking device could also be used. Additionally, with road vehicles, an evasive movement is not possible without endangering the remaining road traffic. Therefore, the anti-collision control would take place by proper acceleration of the vehicles.

While there is shown and described present preferred embodiments of the invention, it is to be distinctly understood that the invention is not limited thereto, but may be otherwise variously embodied and practiced within the scope of the following claims. Accordingly, what is claimed is:

1. An apparatus for guiding a moving, self-guiding object for preventing a collision with further moving objects, said apparatus comprising:

first position indicator means mounted at said self-guiding object for locating said further object, said first position indicator means being equipped for conical scanning motion and having an axis of symmetry in the direction of movement of said self-guiding object;

second position indicator means mounted at said self-guiding object for determining the direction of a spatially fixed axis taken through a gyro axis, said second position indicator means being equipped for conical scanning motion and having an axis of symmetry in the direction of an axis of said self-guiding object;

synchronizing means connecting said first and second position indicator means together for synchronous scanning motion;

said first and second position indicator means providing positional data from said respective angles determined during the revolving scanning between a reference direction and a position in which one object is detected;

analog converter means coupled with storage means for producing the difference between both polar angles measured by said first and second position indicator means, said storage means delivering a signal upon determination of the same angular difference during successive measurement data which correspond to one another;

time-delay means switched on and off by said signal disposed between said second position indicator means and said analog converter means for delaying in time data provided by said second position indicator means; and control means for controlling said self-guiding object, said control means being actuated by said signal and being responsive to the changed angular differences after said time delay for controlling said self-guiding object so as to maintain said changed angular differences constant, said control means switching off after completion of said control.

2. An apparatus as defined in claim 1, wherein said first position indicator means comprises a radar device including an antenna, the axis of symmetry of said antenna being deflected with respect to the direction of movement of said self-guiding object, said antenna being rotatable about an axis disposed in the direction of movement of said self-guiding object.

3. An apparatus as defined in claim 1, further including a gimbal mounted gyro, the axis of rotation of said gyro defining said spatially fixed axis and a radiating point disposed at one end of said axis of rotation of said gyro.

4. An apparatus as defined in claim 3, wherein said radiating point reflects rays in the range of infrared light.

5. An apparatus as defined in claim 1, wherein said second position indicator means comprises an infrared position indicating device including a rotating disk formed of radiation impermeable material, said rotating disk exhibiting a radial gap formed of radiation permeable material.

6. An apparatus as defined in claim 1, further including:

revolving switch means having an input and a plurality of outputs corresponding to the number of switch positions of said switch means;

means for delivering said positional data from said first position indicator means to said input of said switch means;

means for rotating said switch means in synchronism with said first position indicator means for selectively connecting said switch means to said plurality of outputs thereof;

a plurality of analog converter means coupled with respective storage means, the number of storage and analog converter means corresponding to the number of switch positions of said switch means, the respective input of said plurality of analog converter means being connected to said plurality of outputs of said switch means;

means for parallelly delivering said positional data from said second position indicator means to respective inputs of said plurality of storage and analog converter means;

means for connecting respective outputs of said plurality of storage and analog converter means to a distribution circuit; and scanning means controlled by said signal from a storage and analog converter means for selectively scanning said distribution circuit and providing a scanning output representative of signals thereon.

7. An apparatus as defined in claim 6, further including an evaluation means for evaluating said scanning output, said evaluation means delivering a warning signal when a collision is determined.

8. An apparatus as defined in claim 7, wherein said control means include regulator means for controlling the movement of said self-guiding object, said regulator means being switched in by a signal from one of said storage and analog converter means, said regulator means providing a command control regulated by said scanning output.

References Cited

UNITED STATES PATENTS

| | | |
|---|---|---|
| 2,826,380 | 3/1958 | Ketchledge. |
| 3,040,314 | 6/1962 | Hesse. |
| 3,113,211 | 12/1963 | Thews. |
| 3,178,712 | 4/1965 | Fitzgerald et al. ___ 343—112 X |
| 3,208,064 | 9/1965 | Morrel _____ 343—6 |

RODNEY D. BENNETT, JR., *Primary Examiner.*

M. F. HUBLER, *Assistant Examiner.*

U.S. Cl. X.R.

244—3.19; 343—112